United States Patent
Lee

(10) Patent No.: US 8,608,087 B2
(45) Date of Patent: Dec. 17, 2013

(54) SMART CARD CAPABLE OF INDEPENDENTLY DISPLAYING INFORMATION

(71) Applicant: Asia Vital Components Co., Ltd., New Taipei (TW)

(72) Inventor: Dasheng Lee, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 13/727,936

(22) Filed: Dec. 27, 2012

(65) Prior Publication Data

US 2013/0112757 A1 May 9, 2013

Related U.S. Application Data

(62) Division of application No. 13/272,695, filed on Oct. 13, 2011.

(51) Int. Cl.
*G06K 19/06* (2006.01)

(52) U.S. Cl.
USPC ..... 235/492; 235/451; 340/572.1; 340/572.2; 340/572.4; 340/572.5; 340/572.7

(58) Field of Classification Search
None
See application file for complete search history.

(56) References Cited

U.S. PATENT DOCUMENTS

| | | | | |
|---|---|---|---|---|
| 5,122,643 A | * | 6/1992 | Gamou et al. | 235/384 |
| 2005/0258966 A1 | * | 11/2005 | Quan | 340/572.7 |
| 2008/0061152 A1 | * | 3/2008 | Shingai et al. | 235/492 |

* cited by examiner

*Primary Examiner* — Christopher Stanford

(57) ABSTRACT

A smart card capable of independently displaying information is wirelessly connectable to an external interface. The smart card includes a main body, an antenna module, an electronic paper, a drive member and a radio frequency identification chip isolated from the drive member. The antenna module includes a first antenna for receiving first electromagnetic wave and a second antenna for receiving/transmitting second electromagnetic wave. The first and second antennas are respectively connected to the drive member and the radio frequency identification chip. The information can be independently displayed on the smart card to ensure confidence of the data. Moreover, the smart card can be more conveniently used.

3 Claims, 6 Drawing Sheets

US 8,608,087 B2

SMART CARD CAPABLE OF INDEPENDENTLY DISPLAYING INFORMATION

CROSS-REFERENCE TO RELATED APPLICATIONS

The present application is a division of U.S. patent application Ser. No. 13/272,695, filed on Oct. 13, 2011, titled Smart Card Capable of Independently Displaying Information, listing Dasheng Lee as inventor.

BACKGROUND OF THE INVENTION

1. Field of the Invention

The present invention relates generally to a smart card capable of independently displaying information, and more particularly to a smart card, which can be more conveniently used with enhanced data encryption function.

2. Description of the Related Art

The current smart cards can be classified into contactless smart cards and contact smart cards according to the manner in which the data are stored and read. The data of the contactless smart card are accessed by means of induction. Such contactless smart card is applicable to, for example, Easy-Card for public transportation tools or electronic wallet. The contact smart card is applicable to financial card for withdrawal or credit card.

Both the contactless smart card and the contact smart card are inbuilt with IC chips of the components including microprocessors, card operation systems, security modules and memories. By means of the IC chips, the smart card has the functions of calculation, encryption, two-way communication and security. Accordingly, the smart card not only can store the data but also can encrypt the stored data.

However, the conventional smart card has no display function. The transaction information (such as the balance and the consumption amount) is first read by a remote reading end and then displayed on a display of a reader for a user to watch the transaction information. In this case, the user cannot check the transaction information of his/her own smart card at any time. This causes inconvenience in use of the smart card.

Moreover, although the conventional smart card has encryption and protection function for the transaction information, the encryption effect is poor. This is because the remote end reader must first compile the transaction information and then transmit the compiled transaction information to the smart card. The smart card then interprets the received transaction information and translates the transaction information via a translation selector to recover the transaction information transmitted from the remote end reader. Accordingly, the transaction information transmission between the remote end reader and the smart card is performed by way of data exchange. In this case, the transaction information is likely to be interpreted and stolen during the compiling or transmission process. As a result, the transaction information of the smart card is apt to leak out. Furthermore, the electrical energy cannot be saved.

In conclusion, the conventional smart card has the following shortcomings.

1. The conventional smart card cannot independently display the transaction information.
2. It is inconvenient to use the conventional smart card.
3. The data encryption effect of the conventional smart card is poor.

SUMMARY OF THE INVENTION

A primary object of the present invention is to provide a smart card having an electronic paper thereon for independently displaying information.

A further object of the present invention is to provide the above smart card, which has enhanced data encryption function.

A still further object of the present invention is to provide the above smart card, which can be more conveniently used.

To achieve the above and other objects, the smart card capable of independently displaying information of the present invention is wirelessly connectable to an external interface. The smart card includes a main body, an antenna module, an electronic paper, a drive member and a radio frequency identification chip isolated from the drive member. The antenna module includes a first antenna for receiving first electromagnetic wave transmitted from the external interface and a second antenna for receiving/transmitting second electromagnetic wave. The antenna module and the electronic paper are disposed on the main body.

The drive member is disposed in the main body and electrically connected to the electronic paper and the first antenna. According to the received first electromagnetic wave, the drive member controls the electronic paper to display the information. The radio frequency identification chip is disposed in the main body and electrically connected to the second antenna for receiving/transmitting the second electromagnetic wave. The radio frequency identification chip is isolated from the drive member. The first and second antennas are independent from each other to respectively receive the first and second electromagnetic waves. Accordingly, the information can be independently displayed on the smart card to ensure confidence of the data. Moreover, the smart card can be more conveniently used.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
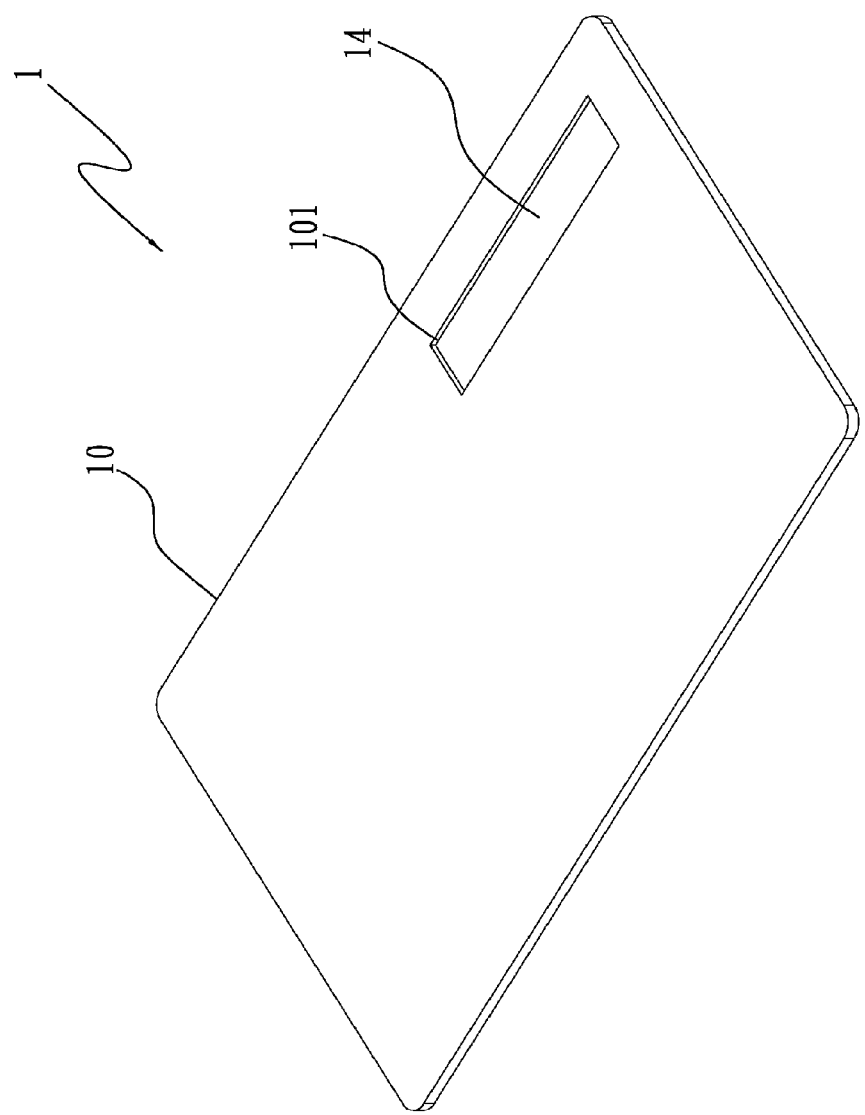
FIG. 1 is a perspective view of a first embodiment of the smart card of the present invention.
Figure 2:
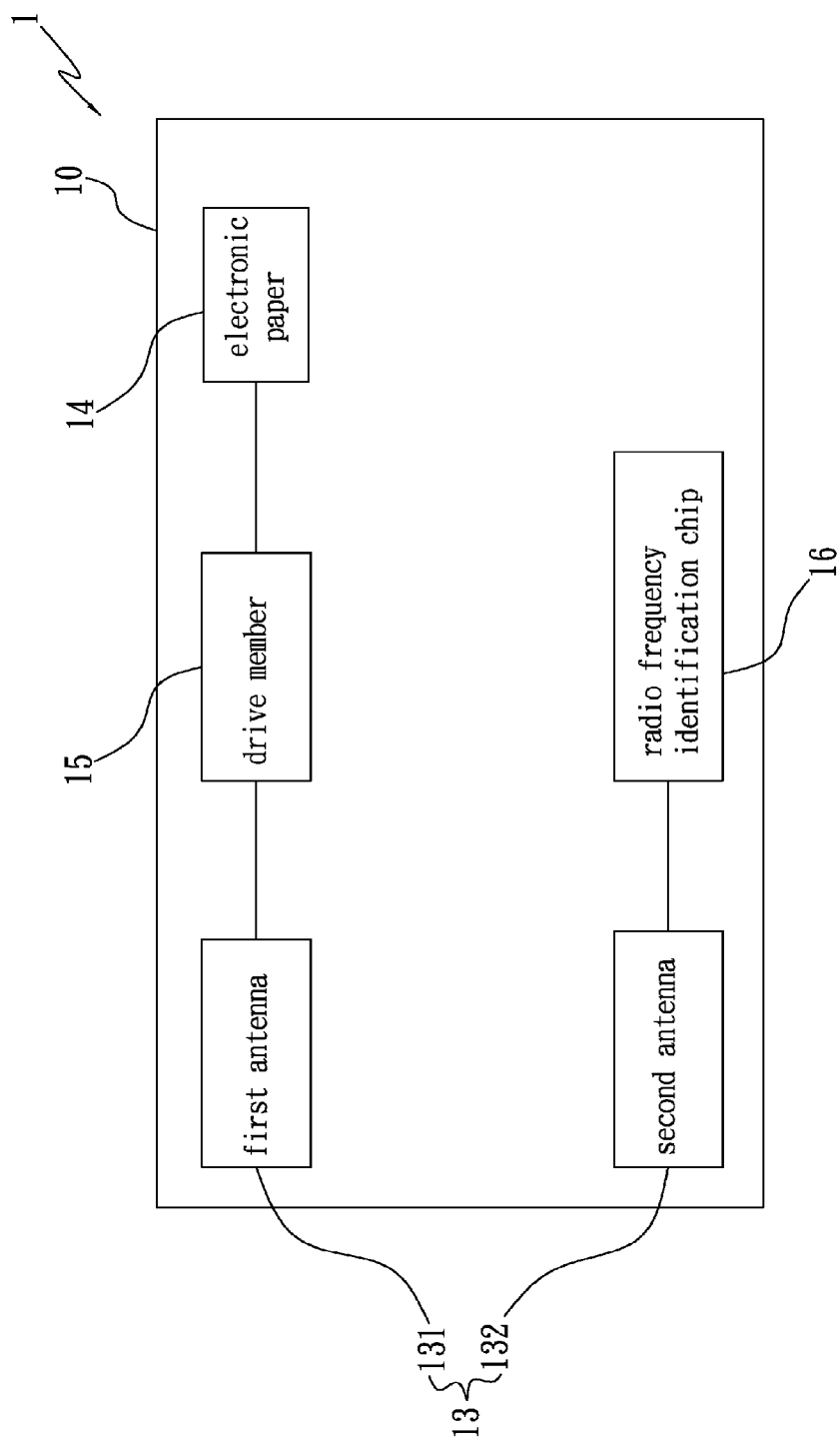
FIG. 2 is a block diagram of the first embodiment of the smart card of the present invention.
Figure 3:
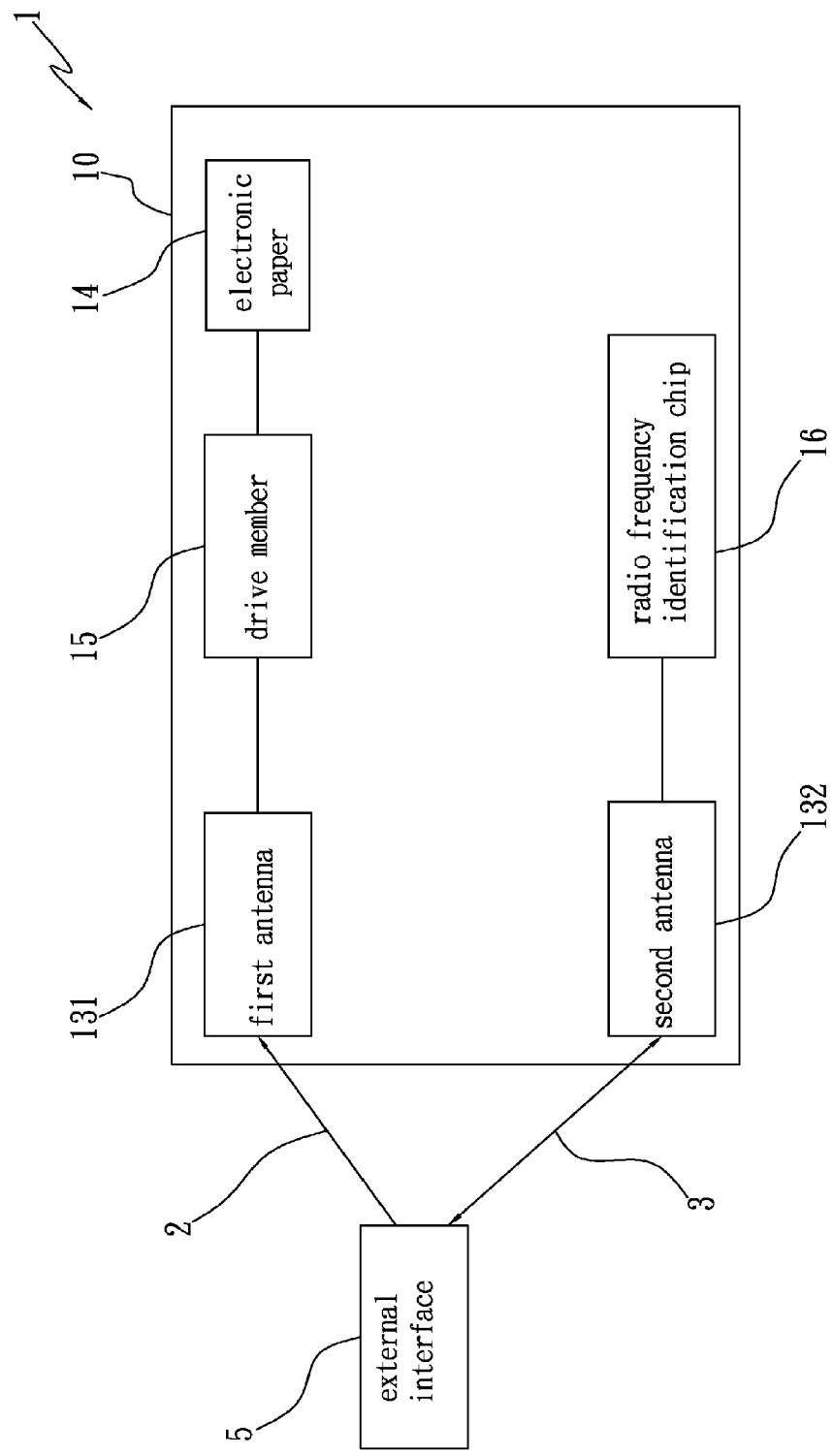
FIG. 3 is another block diagram of the first embodiment of the smart card of the present invention.

Please refer to FIGS. 1, 2 and 3. FIG. 1 is a perspective view of a first embodiment of the smart card of the present invention. FIG. 2 is a block diagram of the first embodiment of the smart card of the present invention. FIG. 3 is another block diagram of the first embodiment of the smart card of the present invention. The smart card 1 is wirelessly connectable to an external interface 5. The smart card 1 includes a main body 10, an antenna module 13, an electronic paper (e-paper)

14, a drive member 15 and a radio frequency identification (RFID) chip 16. The electronic paper 14 and the antenna module 13 are disposed on the main body 10. One side of the main body 10 is formed with a receiving window 101 for receiving the electronic paper 14 therein. The electronic paper 14 of the smart card 1 can display information (such as balance, consumption, riding information, movie information, etc.) for a user to watch.

The antenna module 13 is wirelessly connected to the external interface 5, including a first antenna 131 and a second antenna 132. The first antenna 131 is electrically connected to the drive member 15 for receiving first electromagnetic wave 2 from the external interface 5. The first electromagnetic wave 2 contains a graphic signal and electrical energy. By means of the received electrical energy and graphic signal, the drive member 15 drives and controls the electronic paper 14 to display the information.

The second antenna 132 is electrically connected to the radio frequency identification chip 16 for transmitting/receiving second electromagnetic wave 3. That is, the radio frequency identification chip 16 is able to receive the second electromagnetic wave 3 from the external interface 5 via the second antenna 132 or wirelessly transmit the second electromagnetic wave 3 to the external interface 5 via the second antenna 132. The second electromagnetic wave 3 contains confidential data including user account number, password, label code, etc.

Furthermore, in practice, in order to prevent the first antenna 131 from mis-receiving the second electromagnetic wave 3 from the external interface 5 and prevent the second antenna 132 from mis-receiving the first electromagnetic wave 2 from the external interface 5, the first and second antenna 131, 132 are designed to receive electromagnetic waves with different frequencies respectively. That is, the first electromagnetic wave 2 transmitted from the external interface 5 for the first antenna 131 to receive has a frequency different from that of the second electromagnetic wave 3 transmitted from the external interface 5 for the second antenna 132 to receive. Accordingly, the first and second antennas 131, 132 can normally work to receive the electromagnetic waves.

Please further refer to FIG. 3. The drive member 15 is disposed in the main body 10 and electrically connected to the electronic paper 14 and the first antenna 131. According to the received first electromagnetic wave 2, the drive member 15 controls the electronic paper 14 to display the information. The drive member 15 has multiple internal switch components such as transistors and MOS transistors (not shown). The switch components are triggered according to the level of the received graphic signal so as to control the electronic paper 14 to display the information.

The radio frequency identification chip 16 is also disposed in the main body 10 as the drive member 15. In a preferred embodiment, the radio frequency identification chip 16 is but not limited to arranged opposite to the drive member 15 for illustration purposes only. The radio frequency identification chip 16 is isolated from the drive member 15, that is, is not electrically connected to the drive member 15 as shown in FIG. 2. The radio frequency identification chip 16 and the drive member 15 are independent from each other to receive the first electromagnetic wave 2 of the first antenna 131 and the second electromagnetic wave 3 of the second antenna 132 respectively. In this case, the confidence of the data can be enhanced to avoid data stealing.

Figure 4:
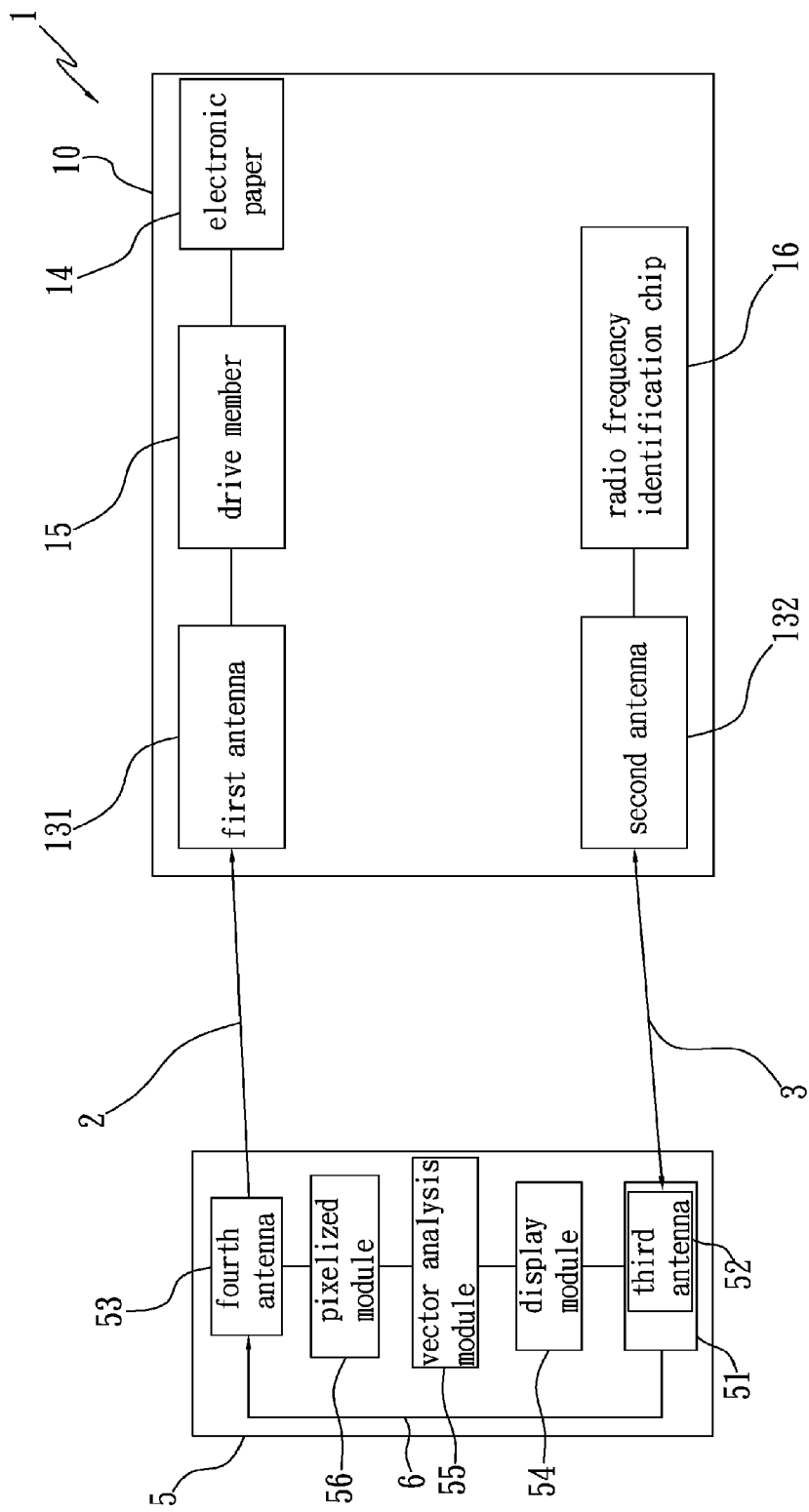
FIG. 4 is still another block diagram of the first embodiment of the smart card of the present invention.

Please further refer to FIG. 4. The external interface 5 includes a reader 51, a display module 54, a vector analysis module 55, a pixelized module 56 and a fourth antenna. The reader 51 has at least one third antenna 52. The third antenna 52 is wirelessly connected to the second antenna 132. According to the received second electromagnetic wave 3, the reader 51 performs reading/writing operation to generate new data and display data. That is, the reader 51 reads the data of the second electromagnetic wave 3 transmitted from the second antenna 132 via the third antenna 52 and operates according to the aforesaid data to generate new data. Then the reader 51 writes the new data into a memory module (not shown) such as an ROM therein for storing the data. At the same time, the new data are converted into the second electromagnetic wave 3, which is wirelessly transmitted from the third antenna 52 to the second antenna 132. Via the second antenna 132, the new data of the second electromagnetic wave 3 are written back onto the radio frequency identification chip 16 for storing the data.

The display module 54 is connected to the reader 51 for displaying the display data transmitted from the reader 51 for a user to watch. The vector analysis module 55 is connected to the display module 54. The vector analysis module 55 serves to operate and convert the received display data into graphic data.

The pixelized module 56 is connected to the vector analysis module 55 and the fourth antenna 53. The pixelized module 56 serves to operate the received graphic data to generate a graphic signal, whereby the external interface 5 converts and combines the graphic signal and the energy wave 6, (that is, the aforesaid electrical energy) provided by the reader 51 into the first electromagnetic wave 2. The first electromagnetic wave 2 is wirelessly transmitted to the first antenna 131 via the fourth antenna 53 in the external interface 5 for the drive member 15 to receive the first electromagnetic wave 2. Accordingly, the electronic paper 14 of the smart card 1 of the present invention is controlled to display the information by means of graphic exchange. Therefore, the electronic paper 14 only knows to display the graphic signal of the first electromagnetic wave 2, while failing to know the data contained in the radio frequency identification chip 16. This enhances the confidence of the whole data and achieves an excellent convenience in use of the smart card 1.

The following are three examples of use of the smart card 1 of the present invention:

FIRST EXAMPLE

Figure 5:
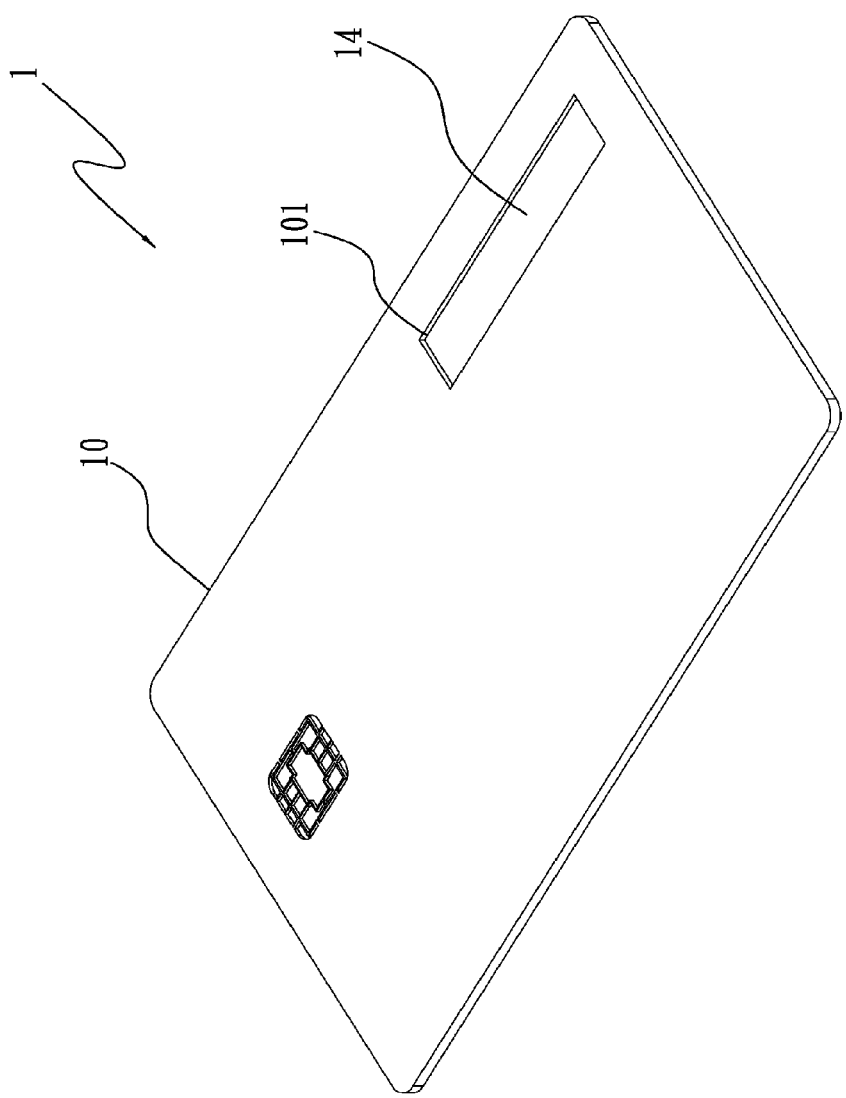
FIG. 5 is another perspective view of the first embodiment of the smart card of the present invention.

The smart card 1 of the present invention can be used instead of the current financial card. Referring to FIGS. 3 and 5, after a user withdraws money from an automated teller machine with the smart card 1, the first and second antennas 131, 132 of the smart card 1 respectively independently receive the first and second electromagnetic waves 2, 3 provided by the external interface 5 positioned in the automated teller machine. The electrical energy of the first electromagnetic wave 2 is supplied to the drive member 15 and the electronic paper 14 in the smart card 1 to power on the same. In the meantime, according to the graphic signal, the drive member 15 controls the electronic paper 14 to display the withdrawal information (such as withdrawal amount, total amount and date). After the withdrawal information is displayed, the picture of the withdrawal information is kept on the electronic paper 14 due to its own properties for a user to watch.

SECOND EXAMPLE

The smart card 1 of the present invention can be used instead of the current EasyCard. Referring to FIGS. 1 and 3, after a user takes the metro with the smart card 1, the first and second antennas 131, 132 of the smart card 1 respectively independently receive the first and second electromagnetic waves 2, 3 provided by the external interface 5 positioned in the metro station. The electrical energy of the first electromagnetic wave 2 is supplied to the drive member 15 and the electronic paper 14 in the smart card 1 to power on the same. In the meantime, according to the graphic signal, the drive member 15 controls the electronic paper 14 to display the riding information (such as the riding balance and riding fee). After the riding information is displayed, the picture of the riding information is kept on the electronic paper 14 due to its own properties for a user to watch.

THIRD EXAMPLE

The smart card 1 of the present invention can be used instead of the current disposable movie ticket. Referring to FIGS. 1 and 3, the first and second antennas 131, 132 of the smart card 1 respectively independently receive the first and second electromagnetic waves 2, 3 provided by the external interface 5 positioned in a theater. The electrical energy of the first electromagnetic wave 2 is supplied to the drive member 15 and the electronic paper 14 in the smart card 1 to power on the same. In the meantime, according to the graphic signal, the drive member 15 controls the electronic paper 14 to display the movie playing information (such as the movie screening, date, seat and hall number). After the movie playing information is displayed, the picture of the movie playing information is kept on the electronic paper 14 due to its own properties for a user to watch.

In addition, the smart card 1 of the present invention can be owned by a user or a theater. In the case a user owns the smart card 1, the user can repeatedly carry the smart card 1 to receive the movie playing information at the theater. In the case that the theater owns the smart card 1, a user can collect the smart card 1 from the theater for receiving the movie playing information at the theater. After seeing the movie, the user returns the smart card 1 to the theater for follow-up users to repeatedly use.

In conclusion, the drive member 15 and the radio frequency identification card 16 of the present invention are independent from each other to respectively receive the first and second electromagnetic waves 2, 3. The drive member 15 serves to control the electronic paper 14 to display the information via the first electromagnetic wave 2, whereby the confidence of the whole data is enhanced and the smart card 1 can be conveniently used.

Figure 6:
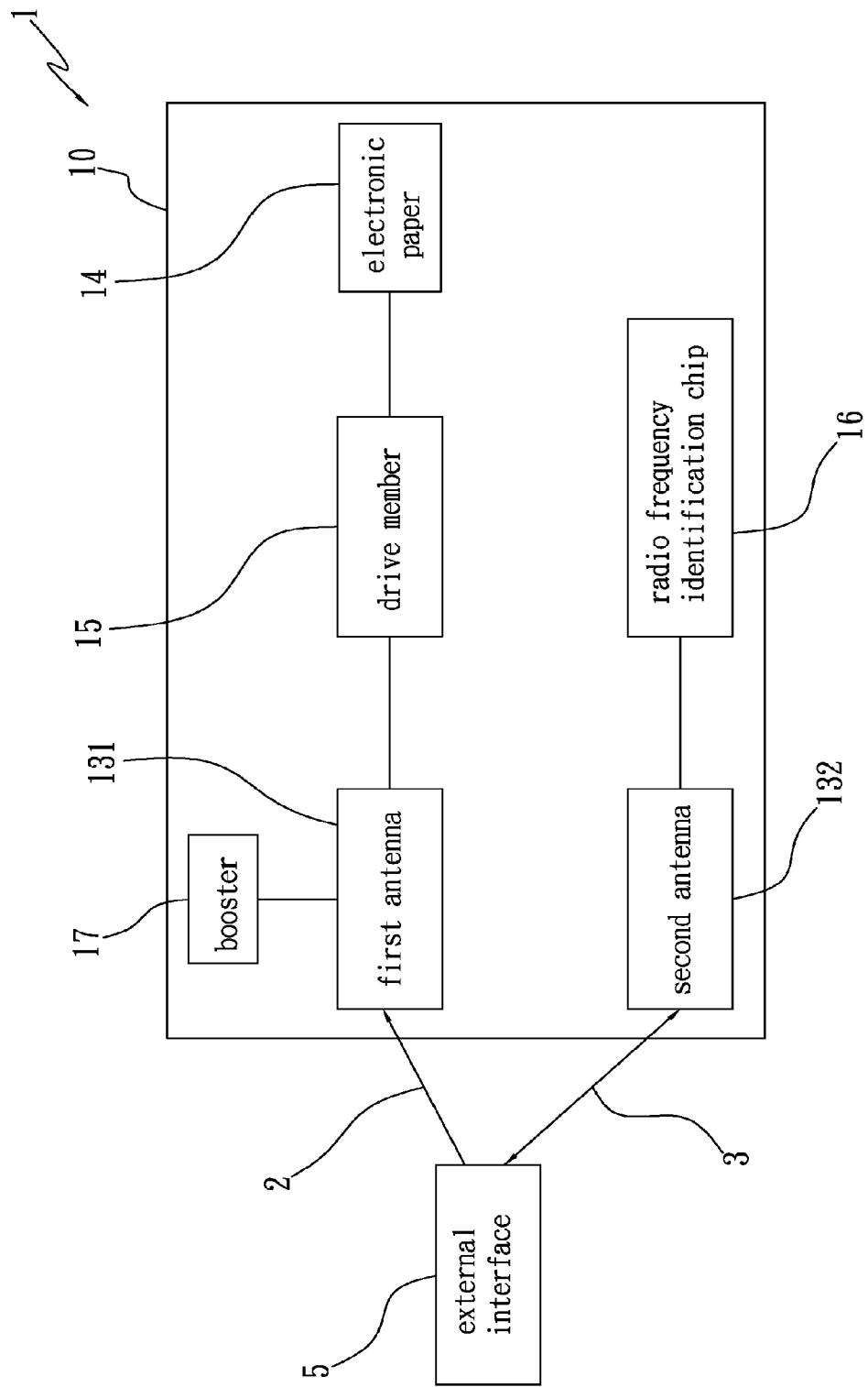
FIG. 6 is a block diagram of a second embodiment of the smart card of the present invention.

Please refer to FIG. 6, which is a block diagram of a second embodiment of the present invention. The second embodiment is substantially identical to the first embodiment in structure, function and connection relationship between the components and thus will not be repeatedly described hereinafter. The second embodiment is different from the first embodiment in that the smart card 1 further includes a booster 17 electrically connected to the first antenna 131 for boosting the electrical energy of the first electromagnetic wave 2 received by the first antenna 131. That is, in case the electrical energy of the first electromagnetic wave 2 received by the first antenna 131 fails to reach a predetermined voltage, (for example, 40 volts), the booster 17 can boost the electrical energy of the first electromagnetic wave 2 to the predetermined voltage to achieve a voltage stabilization effect.

According to the aforesaid, in comparison with the conventional device, the present invention has the following advantages:

1. The information can be independently displayed on the smart card.
2. The confidence of the whole data is enhanced.
3. The smart card can be more conveniently used.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A smart card capable of independently displaying information the smart card being wirelessly connectable to an external interface, the smart card comprising:
a main body;
an antenna module disposed on the main body and including a first antenna and a second antenna, the first antenna serving only, to receive a first electromagnetic wave transmitted from the external interface, the second antenna serving to receive/transmit a second electromagnetic wave, and the first electromagnetic wave received by the first antenna having a frequency different from that of the second electromagnetic wave received by the second antenna;
an electronic paper disposed on the main body;
a drive member disposed in the main body and electrically connected to the electronic paper and the first antenna, according to the received first electromagnetic wave, the drive member controlling the electronic paper to display the information;
a radio frequency identification chip disposed in the main body and electrically connected to the second antenna for receiving/transmitting the second electromagnetic wave, the radio frequency identification chip being isolated from the drive member and not electrically connected to the drive member, wherein the external interface includes:
a reader wirelessly connected to the second antenna, according to the received second electromagnetic wave, the reader performing reading and/or writing operation to generate new data and display data;
a display module connected to the reader for displaying the display data;
a vector analysis module connected to the display module, the vector analysis module serving to operate and convert the received display data into graphic data; and
a video imaging module connected to the vector analysis module, the video imaging module serving to operate received graphic data to generate a graphic signal, whereby the external interface converts and combines the graphic signal and electrical energy provided by the reader into the first electromagnetic wave, the first electromagnetic wave being wirelessly transmitted to the first antenna.

2. The smart card capable of independently displaying information as claimed in claim 1, wherein the reader has a third antenna wirelessly connected to the second antenna.

3. The smart card capable of independently displaying information as claimed in claim 2, wherein the external interface further includes a fourth antenna connected to the pixelized module, the fourth antenna being wirelessly connected to the first antenna.

* * * * *